United States Patent [19]
Dunlap

[11] Patent Number: 5,278,829
[45] Date of Patent: Jan. 11, 1994

[54] REDUCED BROADCAST ALGORITHM FOR ADDRESS RESOLUTION PROTOCOL

[75] Inventor: Kevin J. Dunlap, Kirkland, Wash.

[73] Assignee: Digital Equipment Corporation, Maynard, Mass.

[21] Appl. No.: 639,553

[22] Filed: Jan. 10, 1991

[51] Int. Cl.⁵ .............................................. H04J 3/24
[52] U.S. Cl. ..................................... 370/94.1; 370/60; 340/825.52
[58] Field of Search ................... 370/94.1, 60, 92, 13; 340/825.52, 825.31, 825.33; 371/33

[56] References Cited

U.S. PATENT DOCUMENTS

| | | | |
|---|---|---|---|
| 3,866,175 | 2/1975 | Seifert, Jr. et al. | 340/825.52 |
| 4,597,078 | 6/1986 | Kempf | 370/94.1 |
| 4,696,000 | 9/1987 | Payne | 370/60 |
| 4,740,954 | 4/1988 | Cotton et al. | 370/60 |
| 4,893,307 | 1/1990 | McKay et al. | 370/94.1 |
| 4,910,733 | 3/1990 | Sommani et al. | 370/85.1 |
| 5,025,491 | 6/1991 | Tsuchiya et al. | 340/825.52 |

OTHER PUBLICATIONS

"Internet Request for Comment 826—An Ethernet Address Resolution Protocol or Converting Network Protocol Address to 48-bit Ethernet Address for Transmission on Ethernet Hardware," *Defense Communications Agency, DDN Protocol Handbook—vol. III DARPA Internet Protocols*, Dec., 1985, NIC 5005, SRI International, Menlo Park, Calif., pp. 3-615 to 3-624.

Internet Request for Comment 903—A Reverse Address Resolution Protocol, *Defense Communications Agency, DDN Protocol Handbook—vol. III DARPA Internet Protocols*, Dec., 1985, NIC 5005, SRI International, Menlo Park, Calif., pp. 3-625 to 3-628.

Comer, Douglas, *Operating System Design—vol. II*, 1987, Prentice-Hall Inc., ISBN 0-13-637414-X, Chapters 5 and 6, appendix 3.

Comer, Douglas, *Internetworking with TCP/IP Principles, Protocols, and Architecture, 1988*, Prentice-Hall Inc., ISBN 0-13-470154-2, chapters 5 and 6.

Primary Examiner—Douglas W. Olms
Assistant Examiner—Temesghen Ghebretinsae
Attorney, Agent, or Firm—Flehr, Hohbach, Test, Albritton & Herbert

[57] ABSTRACT

A protocol is provided in which a sending host stores a physical address of a target host as part of the resolution of the physical address from a network address; the sending host keeps track of the elapsed time after physical address storage; upon a subsequent usage of the stored physical address, the sending host tests for the validity of the stored physical address; if the stored physical address is still valid, the sending host can use it to transmit data to the target host; if the stored physical address is no longer valid, then the sending host transmits a broadcast packet onto the network to resolve the physical address of the target host.

5 Claims, 3 Drawing Sheets

REDUCED BROADCAST ALGORITHM FOR ADDRESS RESOLUTION PROTOCOL

BACKGROUND OF THE INVENTION

1. Field of the Invention

The invention relates generally to protocols for communication among hosts in a shared network and more particularly to a protocol for resolving the physical address of a host on a shared network.

2. Description of the Related Art

In large networks which include a multiplicity of hosts that communicate with one another on the network, it frequently is necessary to employ an address resolution protocol to ascertain the address of a target host to which a sending host intends to send information. More specifically, each host in the network ordinarily is assigned a network address which uniquely identifies the host on the network. The network address is assigned by the communication protocol according to a network addressing scheme. In order for a sending host to actually send information to the target host, however, the sending host must ascertain the physical address of the target host. The physical address identifies the target host hardware. Typically, it is represented by the contents of a register on a communication controller of the target host.

One earlier address resolution protocol, for example, uses broadcast packets to resolve the physical address of a host from the network address. Unfortunately, broadcast packets often disturb virtually every host on the network even though information is to be sent only to a single target host. A broadcast packet transmitted onto the network ordinarily is evaluated by every host on the network. Upon receipt of such a broadcast packet, a receiving host responds by interrupting its current activity to determine whether or not the network address included within the broadcast packet matches the respective network address of such receiving host. If there is no match, such receiving host resumes its activity. If there is a match, however, then the receiving host sends out an acknowledge packet to the sending host. The acknowledge packet includes the target host physical address. A disadvantage with the use of broadcast packets is that they often can unnecessarily disturb numerous hosts in an effort to identify a single target host.

One earlier solution to the problem of disruption caused by the use of broadcast packets has been the use of an algorithm which involves storage of the physical address of a target host as part of the communication protocol between a sending host and a target host. By storing the physical address of the target host, that physical address then is available to the sending host at a later time when additional information is to be communicated to the target host. Thus, at such later time the sending host can send the data directly to the target host using the stored physical address without the need to once again transmit broadcast packets onto the network to inquire as to the physical address of the target host.

A shortcoming with such earlier protocols which involve storage of physical addresses has been that the physical address of a target host may change. For example, the target host hardware might be replaced, or the contents of the physical address register might be altered. Thus, the stored physical address may become invalid. A prior solution to this problem was to delete from the memory of the sending host the stored physical address of the target host after a predetermined time interval.

While this earlier solution to the problem of invalid stored physical addresses generally has been acceptable, there have been problems with its use. In particular, this prior practice of deleting the stored physical address after a predetermined time interval can lead to the deletion of physical addresses which are still valid.

Thus, there has been a need for an address resolution protocol which can store the physical address of a target host and which can substantially avoid problems attendant with the storage of an invalid physical address. The present invention meets this need.

SUMMARY OF THE INVENTION

The present invention provides a protocol in which a sending host stores the physical address of a target host as part of the resolution of the physical address from a network address. The sending host keeps track of the elapsed time after physical address storage. Upon a subsequent usage of the stored physical address, the sending host tests for the validity of the stored physical address whenever a prescribed time interval has elapsed between storage of the physical address and a later usage of that address. If the stored physical address is still valid, the sending host can use it to transmit data to the target host. If the stored physical address is no longer valid, however, then the sending host transmits a broadcast packet onto the network to resolve the physical address of the target host.

Thus, in accordance with the present invention, a sending host stores target host physical addresses. The use of such stored physical addresses permits reduced usage of broadcast packets in an address resolution protocol. Moreover, by testing the validity of such stored physical addresses, the protocol can avoid using erroneous physical addresses.

BRIEF DESCRIPTION OF THE DRAWINGS

The purpose and advantages of the present invention will be apparent to those skilled in the art from the following detailed description in conjunction with the appended drawing in which.

DETAILED DESCRIPTION OF THE PREFERRED EMBODIMENT

The present invention comprises a novel network communication protocol. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
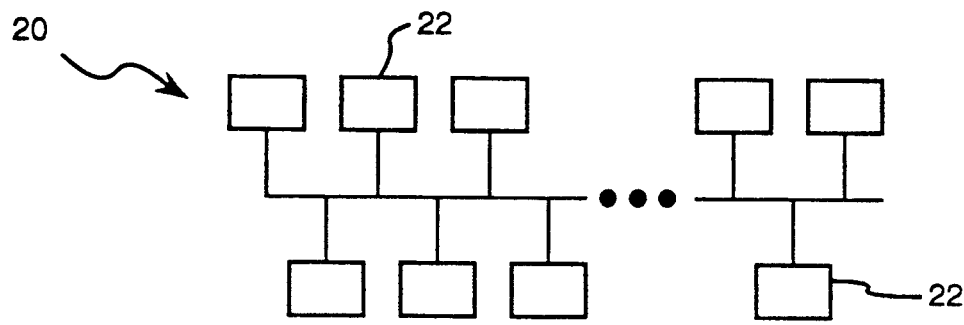
FIG. 1 is a generalized block diagram of a network which includes a multiplicity of hosts which can apply the address resolution protocol of the present invention.

Referring to the illustrative drawing of FIG. 1, there is shown a generalized representation of a network 20 which includes a multiplicity of individual hosts 22. The hosts, for example, can be individual computers coupled to communicate over the network.

In the communication protocol used by the hosts 22 to communicate with each other, each host is assigned its own network address. Information is transmitted over the network in packets. For any given data transmission, a sending host transmits information to a target host which receives the information. The role of a host as a sender of information or as a target for receiving information ordinarily can change with changing information flow in the network. Thus, at one moment a host may serve as a sender, and later it may serve as a target.

In order to actually transmit information between individual hosts on the network, however, a sending host must ascertain the physical address of the target host. In accordance with the present invention, an address resolution protocol is employed to determine the physical address of a target host from its network address without unduly disturbing other non-sending/non-target hosts on the network 20.

Briefly, when a sending host does not know the physical address of a target host, a broadcast packet is transmitted onto the network. The target host responds by transmitting an acknowledge packet addressed to the sending host and containing the target host physical address. The sending host follows by transmitting a data packet addressed to the physical address of the target host. This protocol is described below in more detail.

Figure 2A:
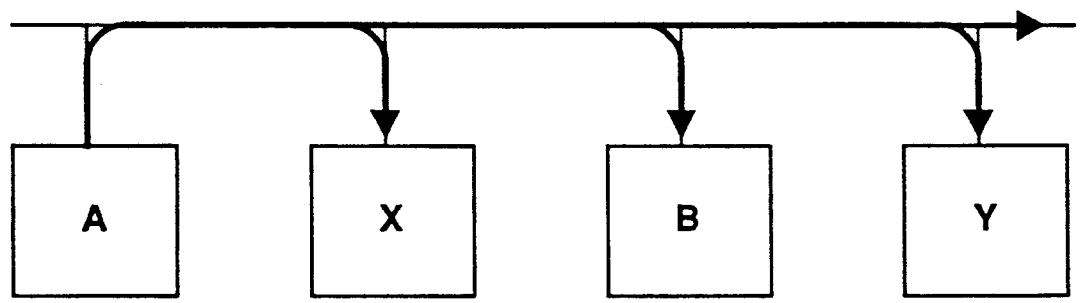
FIG. 2a–2c show a representative segment of the network of FIG. 1 and illustrate transmission of a broadcast packet by a sending host, transmission of an acknowledge packet by a target host, and transmission of a data packet by the sending host, all in accordance with the address resolution protocol of the present invention.
Figure 2B:
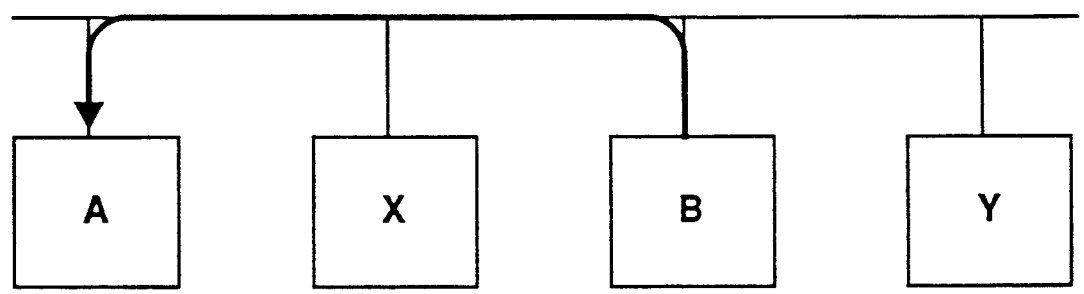
Figure 2C:
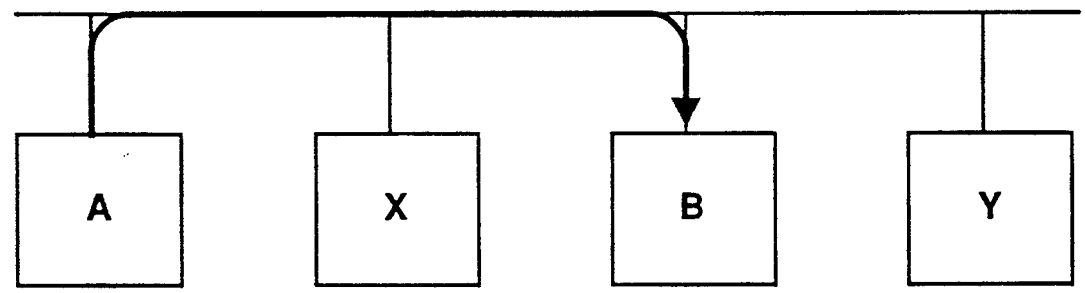

The procedure by which a sending host identifies the physical address of a target host is explained in more detail using the example shown in the illustrative drawings of FIGS. 2a-2c which depict a representative segment of the network 20. In the example, host A is the sending host and host B is the target host. Sending host A, for example, obtains the network address of host B from an application running on the sending host. Before any information can be transmitted from host A to host B, host A must determine the physical address of target host B. Host A first searches its memory to determine whether it has stored the physical address for host B. If it does not find the physical address of host B in memory, then it transmits onto the network 20 a broadcast packet as indicated in FIG. 2a by the bolded arrows.

Figure 3:
FIG. 3 is a simplified representation of a broadcast packet for use in the protocol of the present invention.

The illustrative drawings of FIG. 3 shows a simplified representation of a broadcast packet. The packet includes a header, which identifies the packet as a broadcast packet, and the network address of the target node. The packet also includes an acknowledge request portion which instructs the addressed target host to respond by transmitting onto the network an acknowledge packet addressed to the physical address of the sending host.

As shown in FIG. 2a, each non-sending host B, x and y on the network receives the broadcast packet and determines whether or not the packet is addressed to it. This determination ordinarily involves interrupting activities of such non-sending host to evaluate whether or not the broadcast packet includes its network address. Thus, the broadcast packet can disrupt the operation of each host on the network even though the sending host A wishes to transmit data only to the target host B. The non-target hosts x and y determine that the packet is not addressed to them and resume their previous tasks. The target host B recognizes that the broadcast packet is addressed to it, and as illustrated in the illustrative drawings of FIG. 2b, responds by transmitting onto the network an acknowledge packet indicated by the bolded arrow. The acknowledge packet is addressed to the physical address of the sending host and includes the physical address of the target host B.

Figure 4:
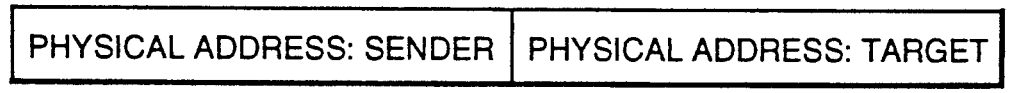
FIG. 4 is a simplified representation of an acknowledge packet for use in the protocol of the present invention.

The illustrative drawing of FIG. 4 shows a simplified representation of the acknowledge packet. It includes the physical address of the sending host and the physical address of the target host.

Figure 5:
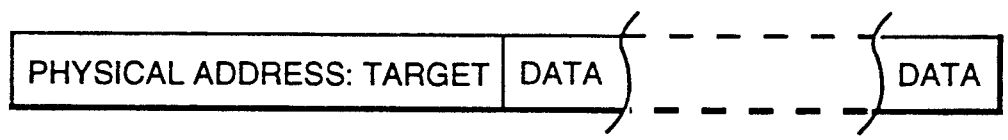
FIG. 5 is a simplified representation of a data packet for use in the protocol of the present invention.

Referring to the illustrative drawings of FIG. 2c, the sending host A responds to the acknowledge packet by transmitting onto the network a data packet addressed to the physical address of the target host B. A simplified representation of a data packet is shown in the drawing of FIG. 5. It includes a physical address portion and a data portion.

Additionally, when the sending host A receives the acknowledge packet, it stores in its memory the physical address of the target host B. Sending host A also stores in its memory an indication that the physical address is valid. It also sets a timer which runs for a first prescribed period of time of 20 minutes in a presently preferred embodiment. During the first prescribed time interval, the sending host will consider the stored physical address for the target host B to be valid. After expiration of the first prescribed time interval, the sending host will consider the physical address to be stale.

In the preferred embodiment, the indication can be represented by the contents of the counter which counts down from a prescribed starting number to zero over the course of the first prescribed time period. Thus, when the indication is set, the count is set to its starting value and the count begins. The stored indication is considered valid until the counter completes the count.

In the event that the sending host A at a later time must again communicate with target host B, then it once again will commence the communication protocol by first determining whether or not it has stored the physical address of target host B in its memory. Since the physical address of target host B was previously stored, the sending host A next checks the stored indication to determine whether the physical address is valid or stale. In the event that the physical address is valid, then, as illustrated in FIG. 2c, the sending host A transmits a data packet addressed to target host B onto the network. The sending host A then resets the indication timer to restart the first prescribed time period during which the stored physical address will be considered valid.

Figure 6:
FIG. 6 is a simplified representation of an address resolution packet for use in the protocol of the present invention.

In the event that, at such later time, upon checking of the indication for the physical address, the sending host A determines that the physical address is stale, then the sending host transmits onto the network an address resolution packet (ARP) which is shown in simplified form in FIG. 6. The address resolution packet includes the stale physical address together with an acknowledge request. The address resolution packet advantageously does not interrupt or otherwise disturb non-sending hosts which do not share the physical address contained within the address resolution packet.

In the event that the stored physical address for host B is still valid despite the indication of staleness, then target host B responds to the address resolution packet by transmitting onto the network an acknowledge packet of the general type shown in FIG. 4. Upon receiving the acknowledge packet from the target host B, the sending host A transmits onto the network a data packet addressed to target host B. The sending host A also resets the indication timer to re-start the first prescribed time period during which the stored physical address for target host B will be considered valid.

If the physical address for target host B in fact has changed and is invalid, the sending host A will not receive an acknowledge in response to the address resolution packet. After waiting for a prescribed second period of time for an acknowledge, ten seconds in the presently preferred embodiment, the sending host transmits a broadcast packet as illustrated in FIG. 2a. The sending host also deletes the stale physical address from memory. The physical address resolution protocol described above then is followed.

Figure 7:
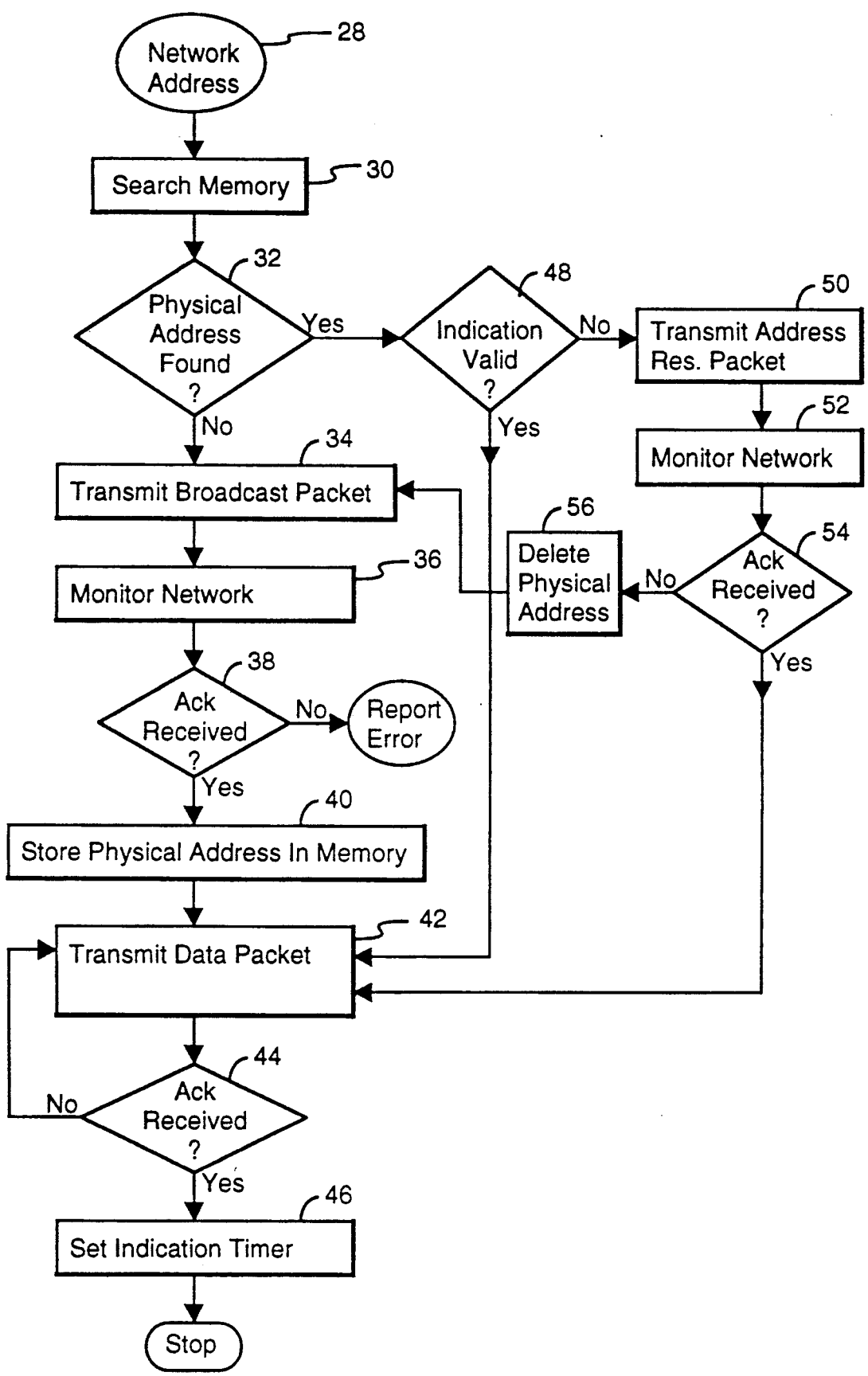
FIG. 7 is a flow diagram illustrating the address resolution protocol of the present invention.

Referring to the illustrative drawings of FIG. 7, there is a shown a flow diagram which graphically explains the address resolution protocol of the present invention. In step 28 a network address of a target host is provided by an application running on the sending host. In step 30 the sending host searches its memory to determine whether it has stored a physical address corresponding to the network address provided in step 28. If in decision step 32 no corresponding physical address is found, then in step 34 the sending host transmits onto the network a broadcast packet which includes the network address. In step 36 the sending host monitors the network awaiting an acknowledge packet from the target host identified by the network address in the broadcast packet. If in decision step 38 no acknowledge packet is received, then an error is reported. In step 40, after receiving an acknowledge packet which includes the physical address of the target host, the sending host stores the physical address of the target host in memory. In step 42 the sending host transmits a data packet addressed to the physical address of the target host onto the network. In decision step 44 the sending host awaits an acknowledge packet from the target host. If no acknowledge packet is received within a prescribed period of time, then the sending host re-transmits the data packet. Assuming that an acknowledge packet ultimately is received from the target host, then in step 46 the sending host sets the indication timer. Otherwise, an error is reported.

If, on the other hand, in decision step 32 the sending host finds a physical address in memory which corresponds to the provided network address, then in decision step 48 the sending host determines whether or not the indication is still valid. If the indication is in fact still valid, then the sending host proceeds to step 42 and transmits onto the network a data packet which includes the stored physical address. If, decision step 48 determines that the indication is no longer valid, then in step 50 the sending host transmits onto the network an address resolution packet which includes the physical address. During step 52 the sending host monitors the network while awaiting an acknowledge packet. In the event that in decision step 54 an acknowledge packet is received, then the sending host proceeds to step 42. If, however, in decision step 54 no acknowledge packet is received, then in step 56 the sending host deletes the stale physical address from memory and proceeds to step 34.

While one particular embodiment of the invention has been shown and explained in detail, it will be appreciated that various modification can be made to the preferred embodiment without departing from the spirit and scope of the invention. Thus, the invention is not intended to be limited to the embodiment shown, but is to be defined by the appended claims, in which:

What is claimed is:

1. In a network including a multiplicity of hosts, a method for communicating among the hosts comprising the steps of:
   (A) prior to transmitting onto the network a data packet addressed to a respective target host identified by a respective target network address, searching a memory of a sending host to determine whether a corresponding physical address has been stored for the respective target network address;
   (B) (1) if in step (A), no corresponding physical address is found in the memory of the sending host, then proceeding to step (B) (2), otherwise, proceeding to step (C);
      (2) transmitting onto the network a broadcast packet which includes the respective target network address;
      (3) monitoring the network by the sending host for an acknowledge packet transmitted onto the network by the respective target host;
      (4) transmitting onto the network by the respective target host, an acknowledge packet which includes the physical address of the respective receiving host;
      (5) storing in the memory of the sending host, the physical address of the respective target host;
      (6) transmitting onto the network by the sending host a data packet including the physical address of the respective target host, and
      (7) proceeding to step (F);
   (C) checking a timer indication stored in the memory of the sending host of whether or not the physical address has been stored in memory for more than a first prescribed resettable time interval during which the physical address of the target host is valid and after which the physical address is stale;
   (D) if, in step (C), the stored physical address is found to be valid, proceeding to step (B) (6), otherwise, proceeding to step (E) (1);
   (E) (1) transmitting onto the network by the sending host an address request protocol packet which includes the stored physical address;
      (2) monitoring the network by the sending host for a second prescribed time period for an acknowledge packet transmitted onto the network by the target host;

(3) if, during the second prescribed time period, the sending host receives an acknowledge packet from the target host, then proceeding to step B (6), otherwise proceeding to step B (2);

(F) resetting the timer indication to the start of the first prescribed resettable time interval during which the stored physical address will be considered valid by the sending host and after which the stored physical address will be considered stale by the sending host.

2. The method of claim 1 and further including the step of:

(B) (3) (i) determining by each respective non-sending host whether the transmitted broadcast packet includes the network address of the respective non-sending host.

3. The method of claim 1 wherein said step of (F) setting an indication includes setting a counter.

4. The method of claim 1 and further including the step of:

(E) (3) (i) deleting the stored physical address from the sending host memory if an acknowledge packet is not received in step (E) (3).

5. In a network including a multiplicity of hosts, a method for communicating among the hosts comprising the steps of:

(A) prior to transmitting onto the network a data packet addressed to a respective target host identified by a respective target network address, searching a memory of a sending host to determine whether a corresponding physical address has been stored for the respective target network address;

(B) (1) if in step (A), no corresponding physical address is found in the memory of the sending host, then proceeding to step (B) (2), otherwise, proceeding to step (C);

(2) transmitting onto the network a broadcast packet which includes the respective target network address;

(3) monitoring the network by the sending host for an acknowledge packet transmitted onto the network by the respective target host wherein said step of monitoring includes determining by each respective non-sending host whether the transmitted broadcast packet includes the network address of the respective non-sending host;

(4) transmitting onto the network by the respective target host, an acknowledge packet which includes the physical address of the respective receiving host;

(5) storing in the memory of the sending host, the physical address of the respective target host;

(6) transmitting onto the network by the sending host a data packet including the physical address of the respective target host, and (7) proceeding to step (F);

(C) checking a timer indication stored in the memory of the sending host of whether or not the physical address has been stored in memory fore more than a first prescribed resettable time interval during which the physical address of the target host is valid and after which the physical address is stale;

(D) if, in step (C), the stored physical address is found to be valid, proceeding to step (B) (6), otherwise, proceeding to step (E) (1);

(E) (1) transmitting onto the network by the sending host an address request protocol packet which includes the stored physical address;

(2) monitoring the network by the sending host for a second prescribed time period for an acknowledge packet transmitted onto the network by the target host;

(3) if, during the second prescribed time period, the sending host receives an acknowledge packet from the target host, then proceeding to step B (6), otherwise proceeding to step B (2);

(F) resetting the timer indication to the start of the first prescribed resettable time interval during which the stored physical address will be considered valid by the sending host and after which the stored physical address will be considered stale by the sending host.

* * * * *